(12) United States Patent
Cahill et al.

(10) Patent No.: US 10,944,561 B1
(45) Date of Patent: Mar. 9, 2021

(54) POLICY IMPLEMENTATION USING SECURITY TOKENS

(71) Applicant: Amazon Technologies, Inc., Seattle, WA (US)

(72) Inventors: Conor Patrick Cahill, Waterford, VA (US); Rachit Jain, Bothell, WA (US); Brigid Ann Johnson, Seattle, WA (US); Praveen Akinapally, Seattle, WA (US); Varun Jayant Oswal, Seattle, WA (US); Jasmeet Chhabra, Bellevue, WA (US); Ritwick Dhar, Redmond, WA (US); Luke Edward Kennedy, Seattle, WA (US); Per Mikael Horal, Sammamish, WA (US)

(73) Assignee: Amazon Technologies Inc., Seattle, WA (US)

( * ) Notice: Subject to any disclaimer, the term of this patent is extended or adjusted under 35 U.S.C. 154(b) by 211 days.

(21) Appl. No.: 15/979,248

(22) Filed: May 14, 2018

(51) Int. Cl.
  *H04L 9/32* (2006.01)
  *H04L 29/06* (2006.01)
  *G06F 21/62* (2013.01)
  *G06F 21/60* (2013.01)

(52) U.S. Cl.
  CPC ........ *H04L 9/3213* (2013.01); *G06F 21/6209* (2013.01); *H04L 63/0807* (2013.01); *G06F 21/604* (2013.01)

(58) Field of Classification Search
  CPC .............. H04L 9/3213; H04L 63/0807; G06F 21/6209; G06F 21/604
  See application file for complete search history.

(56) References Cited

U.S. PATENT DOCUMENTS

| | | | | |
|---|---|---|---|---|
| 8,108,920 | B2* | 1/2012 | Spelman | G06F 21/33 726/20 |
| 8,386,776 | B2* | 2/2013 | Gomi | H04L 63/0807 713/156 |
| 8,943,208 | B2* | 1/2015 | Bafna | G06F 21/6218 709/226 |
| 9,407,664 | B1* | 8/2016 | Banerjee | H04L 63/20 |
| 9,544,294 | B2* | 1/2017 | Srinivasan | H04L 63/08 |
| 9,894,067 | B1* | 2/2018 | Mandadi | H04L 63/0876 |
| 2002/0099952 | A1* | 7/2002 | Lambert | G06F 21/53 726/27 |
| 2006/0206931 | A1* | 9/2006 | Dillaway | H04L 63/0823 726/9 |
| 2006/0259980 | A1* | 11/2006 | Field | H04L 63/0807 726/27 |
| 2011/0004753 | A1* | 1/2011 | Gomi | H04L 9/3213 713/156 |
| 2013/0219473 | A1* | 8/2013 | Schaefer | H04L 63/10 726/4 |

(Continued)

*Primary Examiner* — Matthew Smithers
*Assistant Examiner* — Mirza Israr Javed
(74) *Attorney, Agent, or Firm* — Davis Wright Tremaine LLP

(57) ABSTRACT

A security token service receives a request for a token. The request indicates a set of access control policies that define a set of permissions for access to a resource. The security token service generates the token to comprise a set of identifiers of the set of access control policies. The security token service provides the token in response to the request to enable the token to be used to access the resource in accordance with the set of access control policies.

20 Claims, 8 Drawing Sheets

(56) References Cited

U.S. PATENT DOCUMENTS

| | | | |
|---|---|---|---|
| 2016/0072814 A1* | 3/2016 | Martinelli | H04L 63/101 |
| | | | 726/1 |
| 2016/0127352 A1* | 5/2016 | Xu | H04L 63/08 |
| | | | 726/8 |
| 2016/0140546 A1* | 5/2016 | Taratine | H04W 4/029 |
| | | | 705/76 |
| 2017/0070504 A1* | 3/2017 | Ramachandran | H04L 63/061 |
| 2018/0300471 A1* | 10/2018 | Jain | H04L 63/108 |
| 2018/0309759 A1* | 10/2018 | Leibmann | H04L 63/10 |
| 2019/0294817 A1* | 9/2019 | Hennebert | G06F 16/1824 |
| 2019/0349357 A1* | 11/2019 | Shukla | H04L 63/0853 |

\* cited by examiner

POLICY IMPLEMENTATION USING SECURITY TOKENS

BACKGROUND

Modern computer systems place a high importance on security of user access to computing resources and on maintaining current and accurate policies for the permissions of computer system users to access those computing resources. Resource owners, and other administrators of resources, often use such computing resource policies to control access by computer system users to computing resources in order to support the business needs of the resource owners, administrators, and users. These policies are often encompassed in security tokens, which are valid for a requested short-term duration to enable users that are granted access to these security tokens access to resources in accordance with the encompassed policies. However, in a computer system where many users may have several assigned policies associated with and relating to many different computing resources, maintaining user policies can grow increasingly complex, particularly as the size and/or complexity of the system or the number of computer system users increases. This creates additional difficulty in creating and maintaining security tokens for these users.

BRIEF DESCRIPTION OF THE DRAWINGS

Various techniques will be described with reference to the drawings, in which.

DETAILED DESCRIPTION

Figure 1:
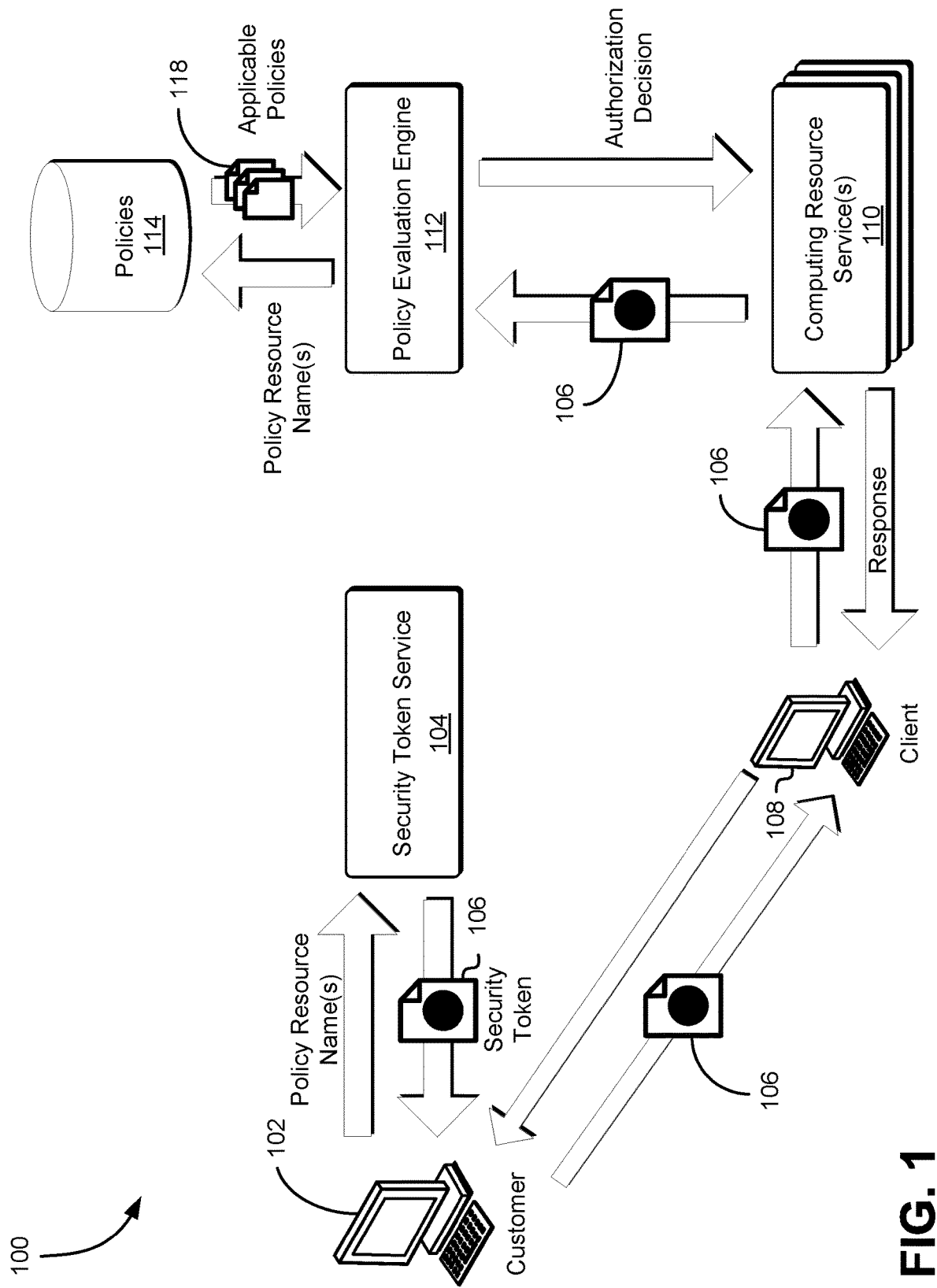
FIG. 1 shows an illustrative example of a system in which various embodiments can be implemented.

Techniques described and suggested herein relate to the creation and use of security tokens that specify a set of policy resource names usable to identify policies for managing access by users to resources of a computing resource service provider. In an embodiment, a security token service extends application programming interface (API) commands to administrators and other users of the security token service to enable these users to provide policy resource names that reference a set of access control policies for resources provided by the computing resource service provider. These policies may be created by these users or by a computing resource service provider on behalf of the users. The policies corresponding to the provided policy resource names may reference other policies within them such that enforcement of these policies and the other policies may adhere to a principle of the most restrictive privilege granting with regard to any request for which these policies are applicable. The security token service may generate, using the provided policy resource names and other information regarding entities subject to the corresponding policies, a security token that is provided to an administrator or other user.

In an embodiment, the security token is provided, by a user, to a computing resource service in a request to the service to access one or more resources provided by the computing resource service. The request may specify a set of actions that the user wishes to perform using a set of resources provided by the service. Further, the request may include authentication information for the user, which can be used by the computing resource service to authenticate the user. The computing resource service may evaluate the provided authentication information to determine whether the user can be authenticated. If the user cannot be authenticated, the computing resource service may deny the request from the user. In an embodiment, if the user is successfully authenticated, the computing resource service transmits the request and the security token to an authorization service to obtain an authorization decision usable to determine whether the request can be fulfilled.

In an embodiment, the authorization service evaluates the provided security token to identify the policy resource names specified within. Using the policy resource names from the security token, the authorization service may determine whether the corresponding policies are stored within a local cache of the authorization service. For instance, these policies may have been previously obtained by the authorization service in response to prior requests for authorization decisions. In an embodiment, if the corresponding policies are not available within the local cache, the authorization service transmits a request to a policy management service to obtain the policies needed to generate the authorization decision. The policy management service may maintain these policies on behalf of users and other computing resource services of the computing resource service provider. In an embodiment, the policy management service enables administrators and other trusted users to generate their own sets of policies that may be applied to requests to access particular resources. Further, the policy management service may maintain other policies defined for use with these services and managed by the policy management service. If the policy management service identifies policies corresponding to the policy resource names provided by the authorization service, the policy management service may provide these policies to the authorization service to enable the authorization service to use these policies to make its authorization decision.

In an embodiment, the authorization service may evaluate the request from the user against the policies obtained from the policy management service to determine whether the request should be fulfilled. For instance, the authorization service may compare an API call associated with the request against permitted API calls specified by the policies to determine if the request should be fulfilled. If the authorization service is not able to match the request to a permission specified by the policies, the authorization service may execute a set of default actions such as, for example, providing an authorization response to the computing resource service that causes the computing resource service to deny the request. If the authorization service matches the request to permissions specified by the policies, the authorization service may resolve this by selecting the most restrictive response (as defined by the policies) and by informing the authorization service, through an authorization decision, as to whether the fulfillment of the request is authorized (i.e., complies with applicable policies) based on that selected response. The authorization service may also select the least restrictive response or may select some other such response and inform the computing resource service whether the fulfillment of the request is authorized based on that selected response.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments are capable of achieving certain advantages. For instance, certain embodiments enhance the security posture for users of temporary security credentials, such as security tokens, by allowing them to define granular access control policies at scale for various use cases. Further, certain embodiments reduce the cost of additional requests made by customers to generate security tokens by allowing multiple policies to be applied to a single security token. As another example, certain embodiments reduce network bandwidth for API requests to the security token service as customers need not make multiple API calls to the security token service to generate multiple security tokens. These customers may pass multiple policy resource names to the security token service in a single API call, which provides greater network efficiency for the customer and the security token service.

FIG. 1 shows an illustrative example of a system 100 in which various embodiments can be implemented. In the system 100, a customer 102 of a computing resource service provider or other service provider transmits, by an associated computing device such as described below, a request to a security token service 104 to generate a security token 106 usable by the customer 102 and other entities to access resources provided by the computing resource service provider through one or more computing resource services 110. In an embodiment, the security token service 104 is a computer system that operates to perform operations described herein, such as the generation of tokens in response to requests. The security token service 104, in an embodiment, comprises a set of computing devices, such as servers as described below, configured to perform operations such as described herein. For instance, in an embodiment, the security token service 104 comprises a web server to which requests are transmitted and from which responses to the requests are transmitted. In an embodiment, the security token service 104 extends one or more APIs to customers of the security token service 104 to enable these customers to provide, in their requests to generate a security token 106, one or more policy resource names corresponding to a set of policies 118 that may be applicable to users of the computing resource services 110 and/or to resources provided via these computing resource services 110. In an embodiment, requests described herein are electronically submitted according to a syntax supported by service (e.g., security token service 104) to which the requests are submitted and responses are likewise transmitted according to the syntax. In an embodiment, the requests are representational state transfer (REST) web API requests, although other types of requests (e.g., simple object access protocol (SOAP) requests) are considered as being within the scope of the present disclosure.

Each policy resource name, in an embodiment, is an identifier that uniquely identifies a policy maintained by a policy management service. Thus, the policy management service may utilize a provided policy resource name to identify a corresponding policy that may be stored in a policy datastore 114 or in any other repository managed by the policy management service or other service on behalf of the policy management service. It should be noted that while policy resource names are used extensively throughout the present disclosure, other identifiers that may uniquely identify policies may be utilized and provided using the APIs extended by the security token service 104.

In an embodiment, the customer 102 provides a set of policies to the security token service 104 via one or more API calls. In response, the security token service 104 assigns, to each policy, a resource name or other identifier that is unique to the provided policy. Further, the security token service 104 stores these provided policies in a policy datastore 114 of the policy management service or in another repository accessible by the policy management service and/or the policy evaluation engine 112. The security token service 104 adds these resource names or other identifiers of these policies to the security token 106. In an embodiment, the policies provided by the customer 102 are stored in the policy datastore 114 or other repository during the life of the security token 106. For instance, each security token 106 specifies an expiration time, after which the security token 106 is invalid for use for authorization purposes. Thus, if the security token 106 is expired, the security token service 104 removes the policies provided by the customer 102 from the policy datastore 114 or other repository where the customer-provided policies are stored.

In an embodiment, a permission (e.g., access control policy or "policy," as described herein) may specify a principal, a resource, an action, a condition, and an effect. In some embodiments, a permission may also specify a plurality of one or more of these elements such as, for example, a set or class of users, a collection of resources, several different actions, and/or multiple conditions. In some embodiments, the permission may specify one or more wildcard or otherwise modifiable characters that may be used to denote that the permission may be modified to make the permission applicable to different users and their associated resources. Wildcards may be represented in various formats—for example, an asterisk may represent any number of characters and a question mark may represent any single character. In some embodiments, the policy may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure. In an embodiment, permissions are associated with a resource through an access control list. For instance, a data storage service can store an access control list (also referred to as an ACL) for objects and/or buckets where the access control list users and/or roles have permissions to access the objects and/or objects in the buckets.

The principal may be a user, a group, an organization, a role, or a collection and/or combination of these or other such entities. A principal may be any entity that is capable of submitting API calls that cause an action associated with a resource to be performed and/or any entity to which permissions associated with a resource may be granted. As an example, a permission may have a principal element specified in the following manner:

"Principal": "rn:ws:pms::allrise99"

In some embodiments, the principal is identified by a resource name that uniquely identifies the principal. A principal may include one or more name spaces that include additional information regarding the principal. For example, "rn" may refer to a resource name prefix and identifies the subsequent information as part of a resource name; "ws" may refer to a partition namespace that the resource is in; "pms" may refer to a service namespace that identifies a service of a computing resource service provider (e.g., the computing resource service provider may provide services related to identity and access management); namespaces may additionally be omitted (note that there are two semi-colons in the example above between "pms" and "allrise99")—in some formats and/or for some resources, a region namespace may be option; and "allrise99" may refer to an identifier for the account, such as the account that owns the resource specified in the permission.

The resource may refer to a computing resource of a computing resource service provider. Computing resources of a computing resource service provider may include: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more. Computing resources may be organized in a hierarchy, and may use structures such as folders, directories, buckets, etc. to organize sets of computing resources into groupings. In some cases, policies and/or permissions may be applied directly to a bucket and grant cross-account access to an environment. As an example, a permission may have a resource element specified in the following manner:

"Resource": "rn:ws:storage:::bucket/AJ99_ROY.png"

In some embodiments, the resource is identified by a resource name that uniquely identifies the resource. In some cases, the resource may share a same naming convention as the principal or other elements of the permission. However, this need not be the case, as each separate element of a permission may use a naming convention, namespace, format, etc. that is independent of other elements. In the example resource given above, "rn" may refer to a resource name prefix and identifies the subsequent information as part of a resource name; "ws" may refer to a partition namespace that the resource is in; "storage" may refer to a service namespace that identifies a service of a computing resource service provider (e.g., the computing resource service provider may provide services related to object-based storage); as discussed elsewhere, namespaces may be omitted in some cases—for example, a region namespace and/or account namespace may be omitted; and a resource which may also include an indicator of the type of resource. In the example above, the resource may indicate an image in the Portable Network Graphics (PNG) format and is stored in a bucket.

The action may be the specific action or actions that will be allowed or denied by the permission. Different types of services (e.g., having different service namespaces) may support different actions. For example, an identity and account management service may support an action for changing passwords, and a storage service may support an action for deleting objects. An action may be performed in association with the resource and may, for example, be identified by a type of API call, a library call, a program, process, series of steps, a workflow, or some other such action. As an example, a permission may have an action element specified in the following manner:

"Action": "storage:GetObject"

An effect may refer to whether the permission is used to grant or deny access to the computing resources specified in the permission in the resource element. An effect may be an ALLOW effect, which grants access to a resource, and a DENY effect, which denies access to a resource. In some embodiments, access to computing resources of a computing resource service provider are denied by default and a permission affirmatively including an ALLOW effect is required. As an example, a permission may have an effect element specified in the following manner:

"Effect": "ALLOW"

Accordingly, a permission statement that grants a particular principal (e.g., "rn:ws:pms:: allrise99") access to call a storage service API (e.g., "storage:GetObject") and obtain a particular image (e.g., "rn:ws:storage::: bucket/AJ99_ROY.png") when a specific condition is true (e.g., the API request is made prior to Dec. 13, 2016) may be specified in the following manner:

"Statement": [
{
  "Effect": "ALLOW",
  "Principal": "rn:ws:psm::allrise99",
  "Action": "storage:GetObject",
  "Resource": "rn:ws:storage:::bucket/AJ99_ROY.png",
  "Condition": {
    "DateLessThan": {
      "ws:CurrentTime": "2014-12-13"
    }
  }
}
]

It should be noted that the examples described above merely described one of many ways in which permissions may be expressed. Of course, in other embodiments, variations on the principles described above may be applied in various ways.

In an embodiment, the security token service 104 is implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein, including providing some or all of the functionality described as a service accessible to entities (e.g., the customer 102, etc.) connecting to the implementing computing resource service provider. In an embodiment, the security token service 104 enables customers, such as customer 102, to request a set of temporary set of credentials (e.g., security token 106, etc.) usable to access resources provided by the one or more computing resource services 110. The policies 118 identified through the security token 106 may provide a set of limited privileges to users of the security token 106. Thus, the security token 106 may be utilized to identify the applicable policies 118 and to determine, based at least in part on these policies 118, whether a corresponding user is authorized to perform a requested action.

In an embodiment, through the use of the APIs provided by the security token service 104, a customer 102 can provide policy resource names corresponding to policies managed by the policy management service or by the customer. For instance, a customer may create a policy that may be applicable to its resources and/or to users associated with the customer. Policies managed by the customer may be stored in the policy datastore 114 or in another repository maintained by the policy management service. Through the policy management service, the customer 102 may update these policies at any time. Policies managed by the policy management service may be created and administered by the policy management service. Further, policies managed by the policy management service may provide permissions and privileges for common use cases related to use of resources and services provided by the computing resource service provider. Customers of the computing resource service provider, such as customer 102, may not be authorized to modify any policies managed by the policy management service. These policies may also be updated periodically or aperiodically by the computing resource service provider or the policy management service. However, the policy resource names corresponding to policies managed by the policy management service may be available to customers of the computing resource service provider to enable these customers to refer to these policies in the security token 106, in their own policies, and the like.

In an embodiment, the policy resource names provided by the customer 102 via API calls to the security token service 104 for creation of a security token 106 correspond to a set of policies that reference other policies. Thus, a policy management service may identify, through the set of policies, any other applicable policies specified therein and provide all relevant policies to a service that receives the security token 106 or the policy resource names specified in the security token 106. In an embodiment, an authorization service, described in greater detail herein, adheres to a principle of the most restrictive privilege granting with regard to any request for which these policies are applicable. Thus, this authorization service may evaluate the policies corresponding to the policy resource names and/or to other policies referred to in the policies corresponding to the policy resource names to identify the most restrictive privileges applicable to a request from a user that has provided the security token 106. While the present disclosure describes that policies may be implemented subject to the principle of the most restrictive privilege, an authorization service may implement these policies subject to other principles, including but not limited to a principle of the least restrictive privilege.

In an embodiment, through the extended APIs, a customer 102 can also provide other resource names that refer to various resource types provided by the computing resource services 110. For instance, the other resource names may refer to logical data containers, virtual machine instances, databases, and the like provided by the various computing resource services 110. These other resource names may be used in conjunction with existing policies 118 that are either associated with users of the computing resource services 110 or roles that may be assumed by these users to retrieve the security token 106 from the security token service 104. The other resource names may be applied to the resulting security token 106 if existing permissions defined for the users and/or roles specify the computing resource services 110 that are relevant to the resource types of the referenced other resource names. For example, if a policy associated with a user indicates that the user is granted full access to a particular service, whereby the user may access any resource provided by the service, a customer 102 may provide a resource name through the APIs extended by the security token service 104 to indicate that the user should be granted access to a particular resource provided by the service. Thus, the security token 106 may specify the resource name corresponding to this particular resource. An authorization service may evaluate the policy in conjunction with the other resource name to determine that the most restrictive privilege for the user enables the user to only access the particular resource subject to the policy. As a result, the user is granted a narrower set of privileges for accessing the computing resource service and the particular resource.

In an embodiment, based at least in part on the provided policy resource names and other resource names corresponding to particular resources and/or resource types, the security token service 104 generates a security token 106. The security token 106 may include a set of temporary credentials for users of the computing resource service provider and/or for users that may be authenticated by the customer 102 itself. The security token 106 may specify an identifier corresponding to an access key and a secret key. Further, the security token 106 may specify the policy resource names and/or the other resource names corresponding to the particular resources and/or resource types for which the set of privileges associated with the applicable policies 118 are to be applied. As the security token 106 may specify an identifier corresponding to an access key and a secret key associated with a particular user or role, this information may be used to identify a set of policies that are applicable to this user or role. Thus, the policy resource names and/or other resource names specified in the security token 106 may be used to define a set of scope down policies that may further narrow the set of privileges granted via the policies applicable to the user or role defined in the security token 106. This enables the principle of the most restrictive privilege for the user or role, as the policies directly associated with the user or role may be subject to the scope down policies identified via the policy resource names in the security token 106 and/or to the particular resource types or resources identified using the other resource names in the security token 106.

In an embodiment, the security token service 104 provides the security token 106 to the customer 102 to fulfill the request. The customer 102, in an embodiment, provides the security token 106 to a client 108 in response to a request from the client 108 to obtain the security token 106 in order to access resources provided by one or more computing resource services 110. This client 108 may be a computer system of a user associated with the customer 102 or of the customer 102 itself. In an embodiment, the customer 102 performs its own authentication methods for associated users that may be granted access to the security token 106 by the customer 102. In an embodiment, the security token 106 is provided directly to the client 108 if the request from the customer 102 to the security token service 104 specifies one or more parameters usable to identify the client 108 as the intended recipient of the security token 106. In an embodiment, the security token 106 is subject to an expiration, whereby the security token 106 is no longer valid if it has expired. For instance, the security token 106 may specify a hash or other cryptographic information corresponding to an expiration time for the security token 106. Thus, an authorization service evaluating the security token 106 may use the hash or other cryptographic information to obtain the expiration time and determine whether the security token 106 has expired.

In an embodiment, one or more computing resource services 110 receive a request from a client 108 to access resources provided by these computing resource services 110. The request may include the security token 106 provided to the client 108 by the security token service 104 or by the customer 102. In response to the request, the computing resource service 110 may transmit the request and the security token 106 to a policy evaluation engine 112 to obtain an authorization decision for the request. The policy evaluation engine 112 may be implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. The policy evaluation engine 112 may be a component of an authorization service provided by the computing resource service provider or may be a stand-alone service of the computing resource service provider.

In an embodiment, the policy evaluation engine 112 evaluates the provided security token 106 to obtain the identifier of the access key and the secret key specified therein. The policy evaluation engine 112 may use the access key and the secret key to validate the security token 106. Further, these keys may be used to decrypt information specifying an expiration time for the security token 106. Thus, the policy evaluation engine 112 may determine, based at least in part on the expiration time of the security token 106, whether the security token 106 has expired and is no longer valid. If the security token 106 has expired and/or the keys are not valid, the policy evaluation engine 112 may transmit a notification to the computing resource services 110 to indicate that the request from the client 108 should be denied.

In an embodiment, if the policy evaluation engine 112 determines that the security token 106 is valid, the security token 106 identifies the user and/or role associated with client 108 from the security token 106. Based at least in part on the identified user and/or role identifier specified in the security token 106, the policy evaluation engine 112 may obtain one or more policies from the policy datastore 114 corresponding to the identified user and/or role. For instance, the policy evaluation engine 112 may submit a request to a policy management service to identify any policies applicable to the identified user and/or role from the security token 106. The policy management service may query the policy datastore 114 to identify policies that have, as a principal, the identified user and/or role.

In an embodiment, the policy evaluation engine 112 also provides, to the policy management service, the various policy resource names specified in the security token 106 to enable identification of the policies corresponding to these policy resource names. Similar to the query described above, the policy management service may query the policy datastore 114 to identify a set of policies corresponding to the provided policy resource names. The policy management service may provide the identified policies 118 to the policy evaluation engine 112 to enable evaluation of the request from the client 108 in accordance with the identified policies 118.

In an embodiment, the policy evaluation engine 112 evaluates the policies 118 to identify the most restrictive set of privileges applicable to the request from the client 108. For instance, if a particular policy specifies that a user is authorized to access a particular resource but another policy specifies that the user or the role assumed by the user is not authorized to access the particular resource, the policy evaluation engine 112 may determine that the user is not authorized to access the particular resource. Thus, using the applicable policies 118, the policy evaluation engine 112 may construct the most restrictive set of privileges for the user and/or role. Based at least in part on this most restrictive set of privileges for the user and/or role, the policy evaluation engine 112 may determine whether the request from the client 108 can be fulfilled.

In an embodiment, if the security token 106 specifies resource names corresponding to particular resources and/or resource types, the policy evaluation engine 112 applies the applicable policies 118 subject to the particular resources and/or resource types indicated via the security token 106. If a policy provided by the policy management service indicates that the user and/or role has full access to a particular computing resource service and the security token 106 specifies a resource name corresponding to a particular resource, the policy evaluation engine 112 may determine that the privileges specified in the policy (e.g., full access) are to be applied only with respect to the specified resource. Thus, the policy evaluation engine 112 may narrow the privileges that are granted to the user and/or role based at least in part on the resource names specified in the security token 106.

In an embodiment, the policy evaluation engine 112, based at least in part on the identified set of privileges for the user and/or rule, generates an authorization decision for the request from the client 108. The authorization decision may specify whether the request from the client 108 may be fulfilled or denied. The computing resource service 110 may evaluate the authorization decision from the policy evaluation engine 112 to determine whether to fulfill the request from the client 108. If the authorization decision indicates that the request cannot be fulfilled (e.g., the user is not authorized to perform the requested actions, etc.), the computing resource service may deny the request from the client 108. Alternatively, if the authorization decision specifies that the request may be fulfilled, the computing resource service may fulfill the request. In an embodiment, the authorization decision specifies the set of privileges applicable to the client 108 should a determination be made that the request should be fulfilled. Thus, the computing resource service may fulfill the request from the client 108 subject to the privileges indicated in the authorization decision.

Figure 2:
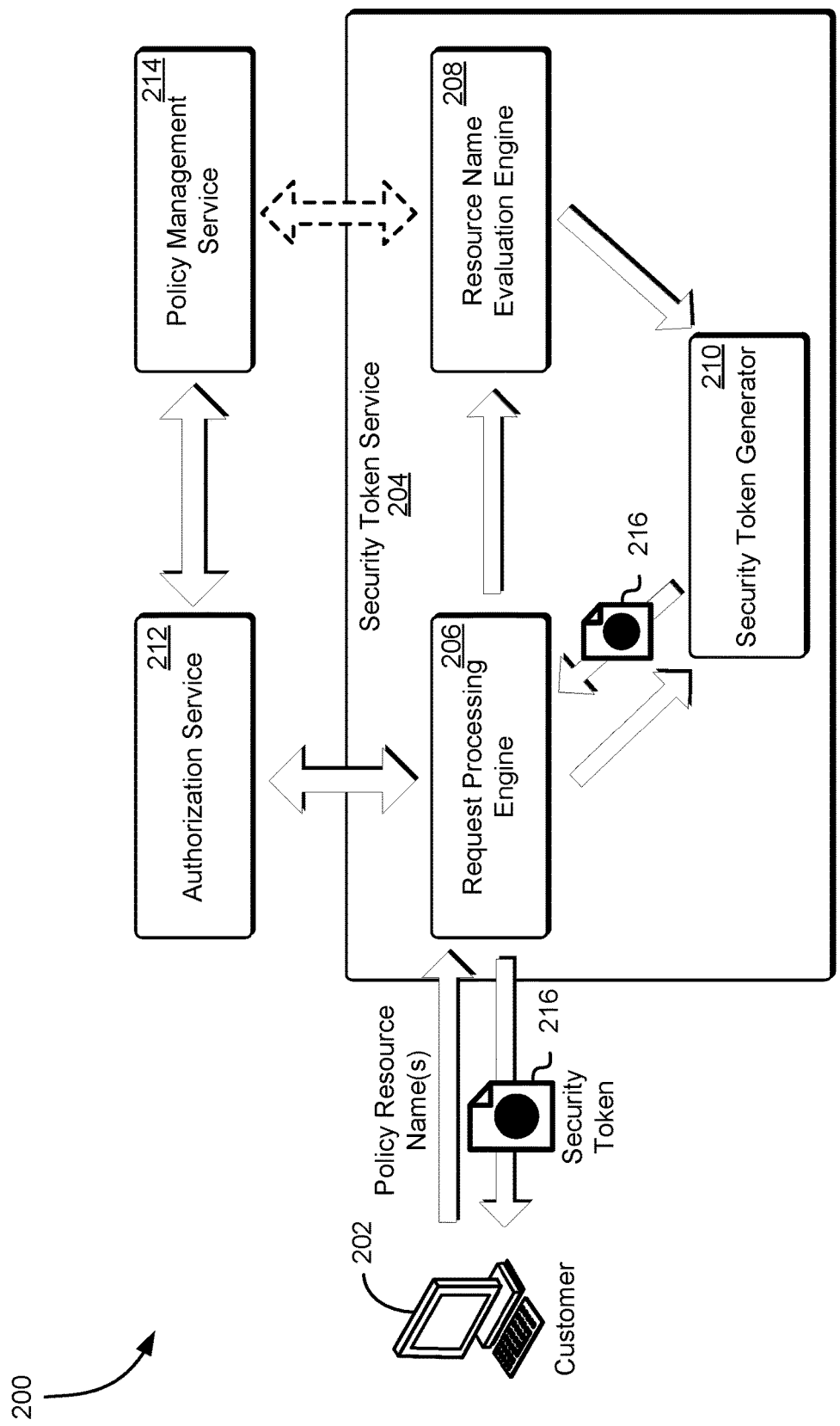
FIG. 2 shows an illustrative example of a system in which a security token service generates a security token comprising a set of police resource names corresponding to policies applicable to a client and to computing resources in accordance with at least one embodiment.

FIG. 2 shows an illustrative example of a system 200 in which a security token service 204 generates a security token 216 comprising a set of police resource names corresponding to policies applicable to a client and to computing resources in accordance with at least one embodiment. In an embodiment, a customer 202 of the security token service 204 submits a request to a request processing engine 206 of the security token service 204 to generate a security token 216 usable by a user of a client to access one or more resources provided by a computing resource service provider. The customer 202 may submit the request using one or more APIs extended by the security token service 204 to users. The customer 202 may submit one or more API calls to the request processing engine 206 to request creation of the security token 216. Through these one or more API calls, the customer 202 may specify a set of policy resource names corresponding to policies managed by the customer 202 and to policies managed by a policy management service 214. These policies may be applicable to the user that is to be provided with the security token 216, as well as to resources that the user may attempt to access. The one or more API calls may also specify other resource names corresponding to resources provided by the computing resource service provider. These other resource names are used to narrow the scope of any policies that may be applicable to requests to access resources provided by a computing resource service provider.

In an embodiment, the request processing engine 206 evaluates the API calls from the customer 202 to determine whether the customer 202 is authorized to enable creation of a security token 216. The request processing engine 206 may be implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. To determine whether the customer 202 is authorized to enable creation of a security token 216, the request processing engine 206 may transmit a request to an authorization service 212 to determine whether the request from the customer 202 can be fulfilled. The authorization service 212 may identify one or more policies applicable to the request. For instance, the authorization service 212 submits a information from the customer request to the policy management service 214, which uses this information to identify any relevant policies. The policy management service 214 provides these policies to the authorization service 212 to enable application of these policies to the customer request. If the authorization service 212 determines, based at least in part on the policies provided by the policy management service 214, that the request should not be fulfilled, the authorization service 212 transmits a notification to the request processing engine 206 to indicate that the request is to be denied.

In an embodiment, if the authorization service 212 transmits a notification to the request processing engine 206 indicating that the request from the customer 202 can be fulfilled, the request processing engine 206 provides the resource names specified in the API calls from the customer 202 to a resource name evaluation engine 208. The resource name evaluation engine 208 may be implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. The resource name evaluation engine 208 may evaluate the resource names provided by the request processing engine 206 to determine whether these resource names correspond to active policies and/or other resources maintained by the computing resource service provider. For example, the resource name evaluation engine 208 may submit a query to the policy management service 214 to determine whether the policy resource names provided by the customer 202 correspond to active policies maintained by the policy management service 214. Similarly, the resource name evaluation engine 208 may submit a query to other computing resource services to determine whether other resource names provided in the API calls from the customer 202 correspond to active resources maintained by these computing resource services.

In an embodiment, the customer 202 can provide, in its request to the request processing engine 206, policy resource names corresponding to one or more policies that, themselves, specify additional policy resource names. In an embodiment, if the resource name evaluation engine 208 identifies, based on a policy resource name provided by the request processing engine 206, a policy that specifies additional policy resource names, the resource name evaluation engine 208 determines whether these additional policy resource names correspond to active policies and/or other resources maintained by the computing resource service provider. If any of the policy resource names specified in an active policy is invalid, the resource name evaluation engine 208 transmits a notification to the request processing engine 206 regarding an invalid reference within an active policy corresponding to a provided policy resource name. The request processing engine 206 may provide a notification to the customer 202 to indicate that it has a policy corresponding to a provided policy resource name specifies an invalid resource name. The request processing engine 206 can elicit either an alternative policy resource name or provide a response indicating that the request may continue to be processed absent the policy resource name corresponding to the offending policy. Alternatively, the request processing engine 206 may return an error message indicating that the request could not be fulfilled due to an invalid resource name being specified in a policy corresponding to a policy resource name provided by the customer 202.

In an embodiment, if the resource name evaluation engine 208 determines that a provided resource name is invalid, the resource name evaluation engine 208 transmits a notification to the request processing engine 206 regarding the invalid resource name. The request processing engine 206 may provide a notification to the customer 202 to indicate that it has provided an invalid resource name and elicit either a correction to the invalid resource name or a response indicating that the request may continue to be processed absent the invalid resource name. Alternatively, the request processing engine 206 may return an error message indicating that the request could not be fulfilled due to an invalid resource name being provided by the customer 202.

In an embodiment, the request processing engine 206 utilizes a security token generator 210 to create the security token 216 in response to the request from the customer 202. The security token generator 210 may be implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein. The security token generator 210 may generate, for a specified user and/or role, an access key and secret key that may be used for authentication of the user and/or role. Further, the security token generator 210 creates the security token 216. The security token 216 specifies the one or more policy resource names and other resource names corresponding to resources and/or resource types provided by the computing resource service provider. The security token 216 also includes the secret key and an identifier corresponding to the access key tied to the user and/or role that is to utilize the security token 216. In an embodiment, the security token 216 specifies an expiration time. This expiration time is utilized by computing resource services and the authorization service 212 to determine whether the security token 216 has expired and is no longer valid for use.

In an embodiment, the security token generator 210, through the request processing engine 206, provides the security token 216 to the customer 202 This enables the customer 202 to perform an authentication process for users that want to access resources of the customer 202 that are maintained by the computing resource service provider. For example, the customer 202 can provide the security token 216 to a user that has been authenticated by the customer 202 via its own processes. This enables the user to utilize the security token 216 to assume a particular role or to utilize its computing resource service provider identity to access a computing resource service and the customer's resources. In an embodiment, the request processing engine 206 provides the security token 216 directly to a client or user specified by the customer 202 in its request to the security token service 204.

Figure 3:
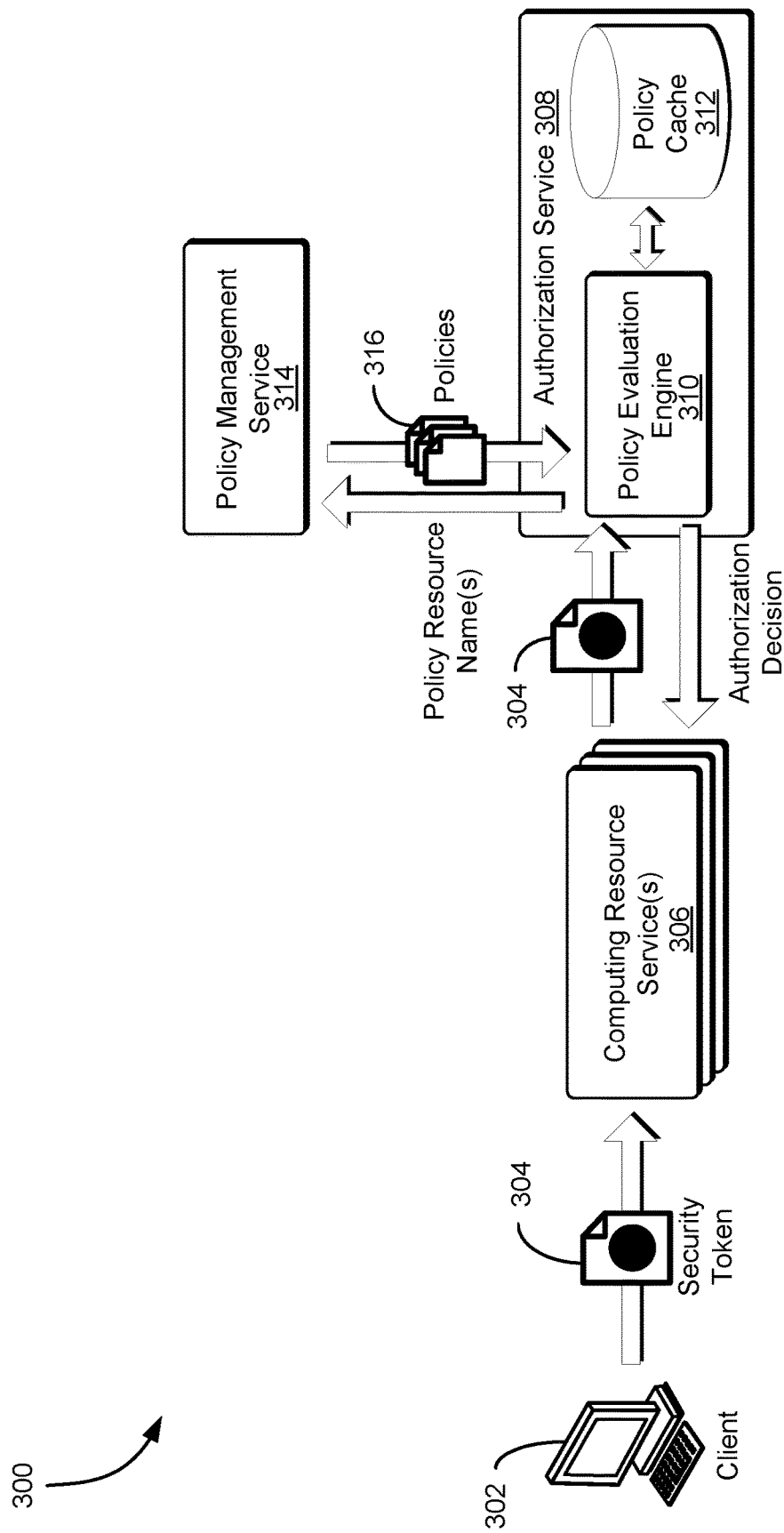
FIG. 3 shows an illustrative example of a system in which a security token is utilized by a policy evaluation engine to identify a set of policies applicable to a request to generate an authorization decision in accordance with at least one embodiment.

FIG. 3 shows an illustrative example of a system 300 in which a security token 304 is utilized by a policy evaluation engine 310 to identify a set of policies 316 applicable to a request to generate an authorization decision in accordance with at least one embodiment. In an embodiment, a computing resource service 306 receives a request from a client 302 to access one or more resources provided by the computing resource service 306. In an embodiment, this request includes a security token 304 usable to authenticate a user of the client 302 and to identify a set of policies 316 usable to determine whether the user is authorized to perform the requested actions (e.g., access the resources provided by the computing resource service 306, etc.).

In an embodiment, the security token 304 specifies an identifier of an access key and a secret key usable to validate the security token 304 and to authenticate the user of the security token 304. The identifier of the access key is usable to identify a set of temporary security credentials for the user, which can be used to authenticate the user. Further, the secret key is usable by the client 302 to digitally sign requests to the computing resource service 306. This enables the computing resource service 306 to authenticate the request from the client 302. In an embodiment, the security token 304 specifies an expiration time. This expiration time may correspond to the date on which the temporary security credentials are set to expire and may be presented in the form of a timestamp within the security token 304. This timestamp may be hashed or encrypted to prevent tampering by other entities. In addition to this information, the security token 304, in an embodiment, specifies one or more policy resource names. These one or more policy resource names correspond to a set of policies 316 maintained by a policy management service 314. The policy management service 314 may be implemented on a computer system or abstraction thereof (such as one or more virtual machines operating via a hypervisor), implemented using hardware and software, and can comprise one or more processors and memory that stores executable instructions whose execution by the one or more processors causes the computer system to perform operations described herein.

In an embodiment, the policy resource names correspond to policies managed by a customer of the computing resource service provider and/or to policies managed by the policy management service 314. These policies each specify a set of privileges for users of the computing resource services 306 and the resources provided by these services. The policies may be associated with a particular user or role identifier, such that these policies may be applicable to the particular user or role regardless of the request from the user. The policies may alternatively be associated with a particular resource or resource type. Thus, any request to access the particular resource or a resource of the particular resource type may be subject to policies associated with the particular resource and/or resource type.

In an embodiment, in response to the request from the client 302, the computing resource service 306 provides the request and the security token 304 to a policy evaluation engine 310 of the authorization service 308 to determine whether the request can be fulfilled (e.g., the client 302 is authorized to access the computing resource service 306 to perform the requested actions, etc.). The policy evaluation engine 310 identifies, from the security token 304, the access key identifier and the secret key and utilizes these to determine whether the user of the client 302 can be authenticated. For instance, the request from the client 302 can be a digitally signed request provided with a digital signature. The secret key can be used to authenticate the digital signature provided in the request. The access key identifier is utilized by the policy evaluation engine 310 to identify the secret key usable to verify the digital signature.

In an embodiment, the security token 304 specifies an expiration time. The policy evaluation engine 310 evaluates the expiration time specified in the security token 304 to determine whether the security token 304 has expired. In an embodiment, if the security token 304 has expired, the policy evaluation engine 310 provides an authorization decision indicating that the request from the client 302 should be denied as a result of the security token 304 having expired. If the security token 304 is valid and has not expired, the policy evaluation engine 310 may obtain the policy resource names from the security token 304. The policy resource names correspond to policies 316 maintained by the policy management service 314. Policies maintained by the policy management service 314 may be managed by a customer of the computing resource service provider. The customer may create and modify these policies to specify privileges for users and roles corresponding to the customer's resources. Policies maintained by the policy management service 314 may, alternatively, be managed by the policy management service 314 itself. Policies managed by the policy management service 314 may not be modified by other entities. These policies can also be updated periodically or aperiodically by the computing resource service provider or the policy management service 314. However, the policy resource names corresponding to policies managed by the policy management service 314 are available to customers of the computing resource service provider to enable these customers to refer to these policies in the security token 304, in their own policies, and the like.

In an embodiment, the policy evaluation engine 310 queries a policy cache 312 of the authorization service 308 to determine whether any of the policies corresponding to the policy resource names from the security token 304 are stored within the policy cache 312. The policy cache 312 is implemented using memory, a storage device, a computer system, or abstraction thereof. The policy cache 312 may store, for a limited period of time, a set of policies previously obtained by the policy evaluation engine 310 from the policy management service 314 in response to other requests provided by the computing resource service 306. Thus, if any of the policies corresponding to the policy resource names from the security token 304 are stored in the policy cache 312, the policy evaluation engine 310 obtains these policies from the policy cache 312 for evaluation of the request. If the policy evaluation engine 310 still requires additional policies corresponding to the policy resource names specified in the security token 304, the policy evaluation engine 310 submits a request to the policy management service 314 to obtain these policies 316. This request specifies the applicable policy resource names from the security token 304.

In an embodiment, the policy management service 314 identifies the policies corresponding to the provided policy resource names, as well as other policies that are applicable to the user of the client 302 and to the resources that the user has requested access to. The policy management service 314 provides these policies 316 to the policy evaluation engine 310 for processing. In an embodiment, the policy evaluation engine 310 processes these policies 316 to identify the most restrictive set of privileges and permissions applicable to the request. For example, if a particular policy indicates that a user is permitted to access a set of resources from the computing resource service 306 but another policy indicates that the user is not permitted to access the set of resources, the policy evaluation engine 310 will select the most restrictive privilege, e.g., that the user is not permitted to access the set of resources.

In an embodiment, the security token 304, in addition to specifying a set of policy resource names, specifies a set of resource names corresponding to resources and resource types provided by the computing resource services 306. The policy evaluation engine 310, in an embodiment, utilizes these resource names to scope down existing policies 316 obtained from the policy management service 314 to generate the set of most restrictive privileges for the user. For example, if a policy specifies that the user is authorized to access all resources provided by a computing resource service 306, and the security token 304 includes a resource name corresponding to a particular resource, the policy evaluation engine 310 scopes down the policy to identify a privilege that indicates that the user is authorized to access the particular resource instead of all resources by the computing resource service 306. Thus, resource names specified in the security token 304 that correspond to resources or resource types provided by the computing resource services 306 serve as parameters to narrowly tailor the policies 316 from the policy management service 314 applicable to the request from the user of the client 302.

In an embodiment, the security token 304 can also specify a set of resource names corresponding to a particular set of resources usable to perform an authorization process based on the policies identified via the policy resource names. The policy evaluation engine 310, if it detects that the security token 304 includes one or more resource names corresponding to the particular set of resources, passes the policies corresponding to the policy resource names to the particular set of resources. This enables the particular set of resources identified via the security token 304 to perform the authorization process described herein. This further enables a customer to configure the particular set of resources to perform an individualized authorization process, whereby permissions and privileges are defined in accordance with the customer's configuration of these resources. In an embodiment, these resource names are specified in the security token 304 utilizing a distinct authorization method field of the security token, which, when evaluated by the policy evaluation engine 310, causes the policy evaluation engine 310 to identify the particular set of resources that are to perform the authorization process.

In an embodiment, the policy evaluation engine 310 uses the most restrictive privileges identified based at least in part on the obtained policies 316 and the resource names specified in the security token 304 to generate an authorization decision for the request from the client 302. If the policy evaluation engine 310 determines, based at least in part on these privileges, that the request should not be fulfilled, the policy evaluation engine 310 generates an authorization decision indicating that the request should be denied. The computing resource service 306, in response to this authorization decision, denies the request from the client 302 as the user of the client 302 is not authorized to perform the requested actions. However, if the policy evaluation engine 310 determines that the user is authorized to perform the requested actions, the policy evaluation engine 310 provides an authorization decision to the computing resource service 306 indicating that the request can be fulfilled. The authorization decision, in an embodiment, specifies the applicable privileges identified by the policy evaluation engine 310. This enables the computing resource service 306 to fulfill the request from the client 302 in accordance with the specified set of privileges.

In an embodiment, policy evaluation occurs through various mechanisms not illustrated in FIG. 3. In an embodiment, each computing resource service 306 maintains its own policy evaluation engine 310, which can process the set of policies 316 obtained from the policy management service 314 and/or the policy cache 312. The authorization service 308, in an embodiment, provides the policies corresponding to the policy resource names specified in the security token 304 and policies corresponding to the client 302 based on the user's identity or role to the policy evaluation engine 310 maintained by the computing resource service 306. The policy evaluation engine 310 evaluates the policies 316 to identify the most restrictive set of privileges applicable to the request from the client 302. Further, the policy evaluation engine 310 applies this most restrictive set of privileges to the request to determine whether the request can be fulfilled.

In an embodiment, the policy evaluation engine 310 provides the most restrictive set of privileges to the computing resource service 306 in lieu of an authorization decision. The computing resource service 306, through an authorization component or other process, evaluates the received set of privileges derived from the set of policies 316 to determine whether the request from the client 302 can be fulfilled. Thus, the authorization decision is generated locally within the computing resource service 306 instead of at the authorization service 308.

Figure 4:
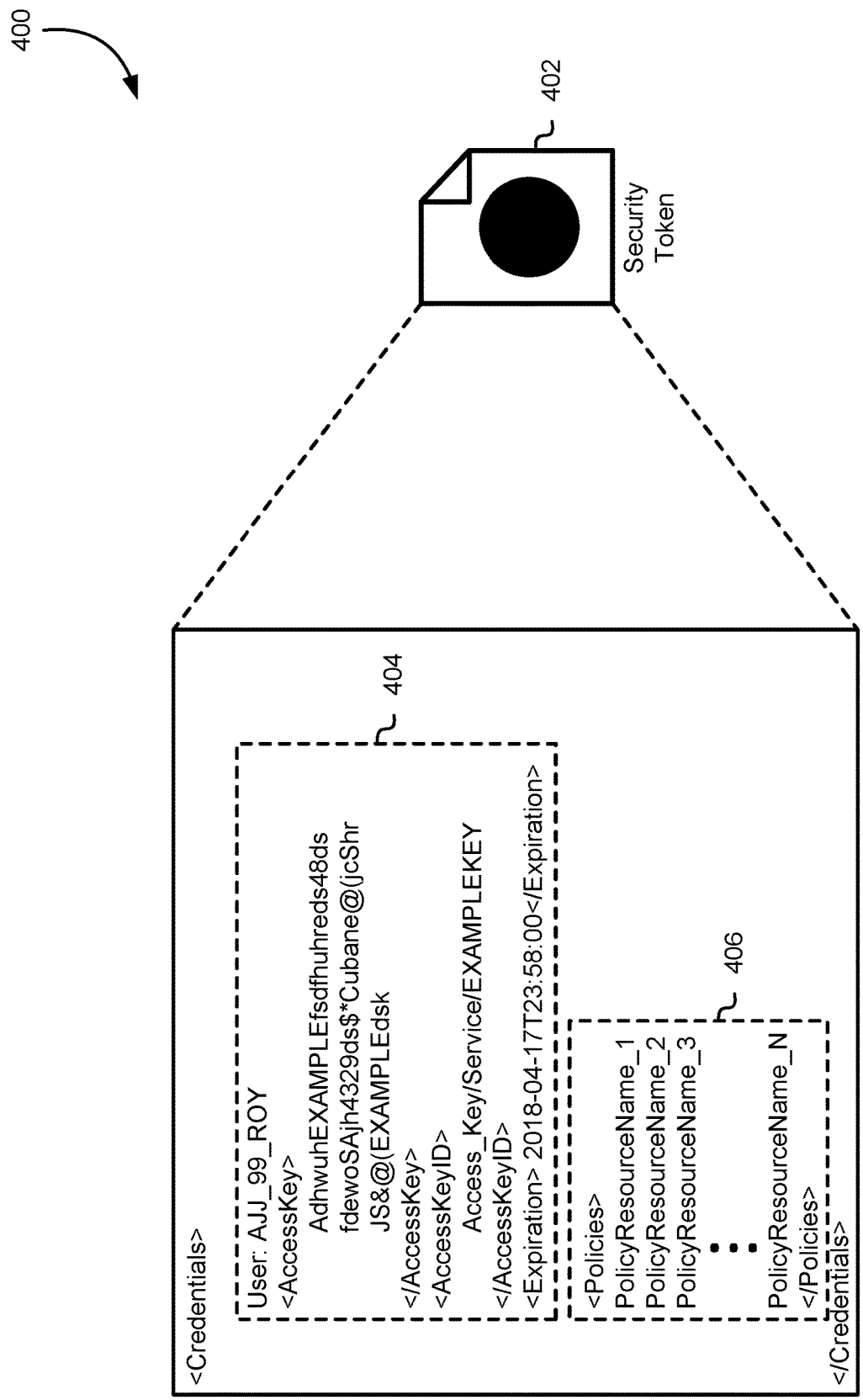
FIG. 4 shows an illustrative example of a system in which a security token is provided that specifies a set of policy resource names corresponding to a set of policies applicable to requests in which the security token is provided in accordance with at least one embodiment.

FIG. 4 shows an illustrative example of a system 400 in which a security token 402 is provided that specifies a set of policy resource names corresponding to a set of policies applicable to requests in which the security token 402 is provided in accordance with at least one embodiment. In an embodiment, the security token 402 includes a variety of fields that are usable to authenticate a user and determine whether the user is authorized to perform a set of requested actions. The security token 402 specifies a credentials field 404, which specifies an identifier of the user to whom the security token 402 is provided and/or the role that can be assumed by the user in accessing the computing resource service provider. In an embodiment, the credentials field 404 further includes a set of temporary credentials usable to authenticate the user of the security token 402. These temporary credentials include an identifier of an access key and a secret key (e.g., the access key itself). The secret key can be used, by a user, to digitally sign a request to a computing resource service. The access key identifier is utilized by a policy evaluation engine to identify the secret key usable to verify the digital signature. Thus, using the access key identifier, a policy evaluation engine can determine whether a corresponding access key is maintained by the authorization service. If so, the policy evaluation engine can use this access key (e.g., secret key) to validate the digital signature included in the request and the secret key specified in the credentials field 404 of the security token 402.

In an embodiment, the credentials specified in the credential field 404 are also usable to identify a set of policies applicable to the user and/or role specified in the credential field 404. This set of policies may specify a first set of privileges that are applicable to requests from the user or from an entity assuming a role specified in the credential field 404. These policies are maintained by a policy management service and are provided to a policy evaluation engine upon request. For example, the policy evaluation engine, in response to a request from a user to perform an action, provides the user's credential information to the policy management service. The policy management service uses the user's credential information to identify any policies that identify the user or the user's role as a principal of these policies. These policies are provided to the policy evaluation engine to enable the policy evaluation engine to identify the applicable privileges of the user and/or user role for determining whether the user is authorized to perform the requested action.

In an embodiment, the security token 402 further includes a resource name field 406, which specifies one or more policy resource names corresponding to scope down policies applicable to the user and/or user role. In an embodiment, a scope down policy is an access control policy that sets permissions relative to a set of other policies. In an embodiment, a scope down policy restricts permissions relative to the set of other policies. Further, the resource name field 406, in an embodiment, specifies a set of resource names corresponding to resources or resources types provided by a computing resource service. Resource names corresponding to particular resources or resource types are used by a policy evaluation engine to scope down any policies obtained based at least in part on the credential information specified in the credential field 404. For example, if the set of policies obtained based at least in part on the credential information specified in the credential field 404 indicate that a user is authorized to access all resources of a particular type provided by a computing resource service, the policy evaluation engine can utilize the resource names corresponding to particular resources specified in the resource name field 406 to scope down these policies such that the policies are narrowed to only be applicable for these particular resources. Thus, a user, instead of being granted access to all resources of the particular type, is granted access to the particular resources.

In an embodiment, a policy evaluation engine provides the policy resource names from the resource name field 406 to a policy management service to obtain a corresponding set of policies. The policy evaluation engine evaluates these policies, as well as any other policies obtained based at least in part on the credential information specified in the credential field 404, to identify the most restrictive privileges applicable to a request from a user to access resources provided by a computing resource service. Using the most restrictive privileges identified via evaluation of the applicable policies, the policy evaluation engine determines whether the request from the user should be fulfilled or denied. This determination is indicated via an authorization response that is provided by the policy evaluation engine to the computing resource service that initially received the request from the user to access resources provided by the computing resource service. In an embodiment, the policy evaluation engine provides these privileges to the computing resource service to enable the computing resource service to regulate user access to the requested resources in accordance with these privileges.

In an embodiment, the security token 402 includes one or more additional fields, which can be used to define other parameters that are usable to identify an authorization mechanism for processing requests from a user that provides the security token in its requests. In an embodiment, the security token 402 includes an authorization resource name field, which can be used to specify resource names corresponding to a set of resources operable to perform an authorization process using policies corresponding to the policy resource names specified in the resource name field 406. In an embodiment, if the policy evaluation engine identifies resource names specified in the authorization resource name field of the security token 402, the policy evaluation engine identifies the resources corresponding to the resource names specified in the authorization resource name field. The policy evaluation engine provides the applicable policies to the identified resources to enable these resources to perform an authorization process using the applicable policies and to provide an authorization decision based on the applicable policies.

Figure 5:
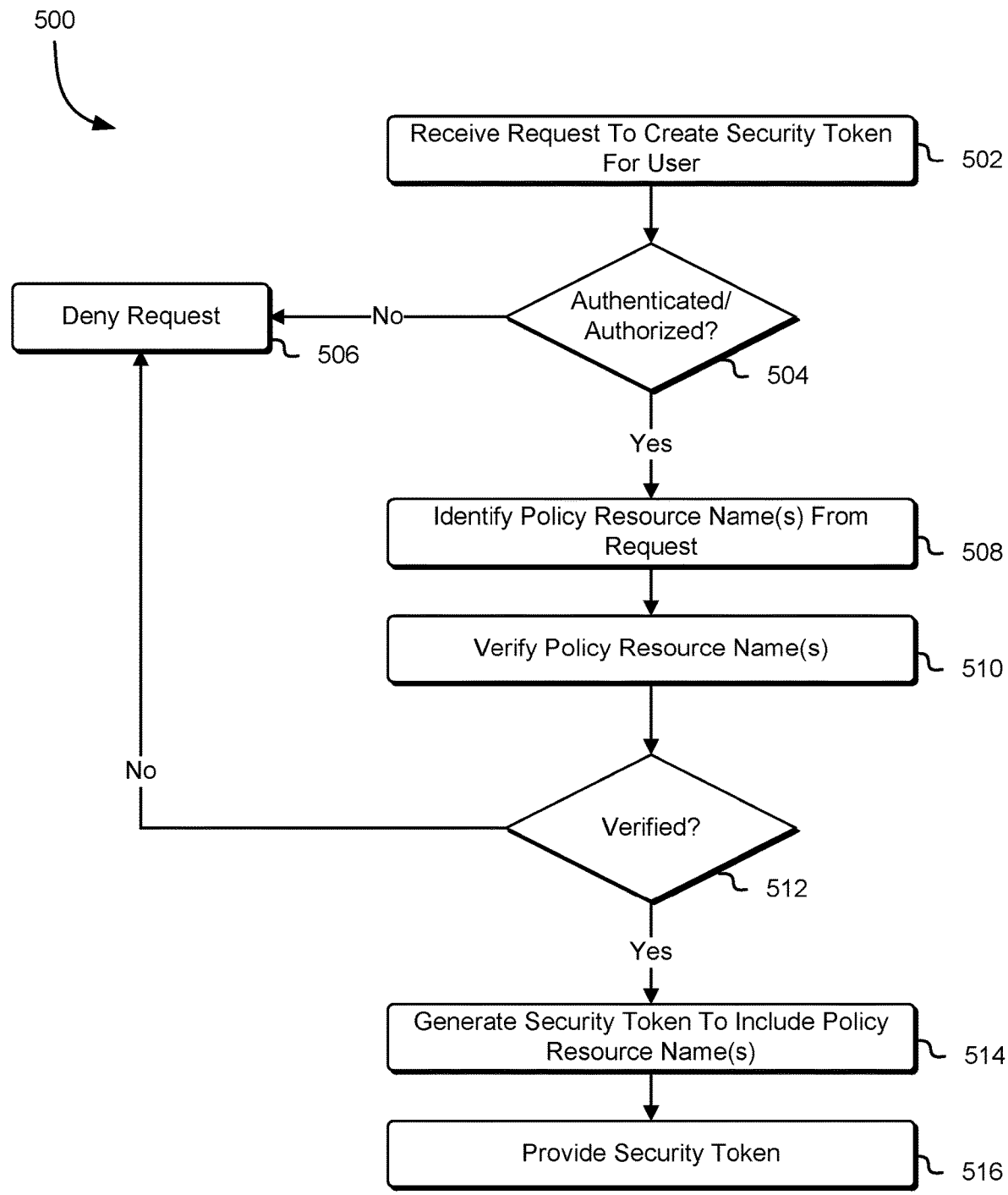
FIG. 5 shows an illustrative example of a process for generating a security token specifying a set of policy resource names usable to identify a set of policies applicable to requests that include the security token in accordance with at least one embodiment.

FIG. 5 shows an illustrative example of a process 500 for generating a security token specifying a set of policy resource names usable to identify a set of policies applicable to requests that include the security token in accordance with at least one embodiment. The process 500 may be performed by a security token service or by a computer system or abstraction thereof (such as one or more virtual machines operating via a hypervisor), implemented using hardware and software, and can comprise one or more processors and memory that stores executable instructions whose execution by the one or more processors causes the computer system to perform the operations described herein by a security token service. In an embodiment, the security token service receives 502 a request to create a security token for a user or set of users that are authorized by the requestor to assume a particular role. The request may be provided in the form of one or more API calls to the security token service, which may extend these APIs to customers of the service, including the requestor. Further, in an embodiment, the request specifies one or more policy resource names corresponding to scope down policies that are applicable to the user or set of users that are to utilize the security token. These scope down policies, in conjunction with other policies applicable to users based at least in part on their identity, are used to determine a most restrictive response to requests from these users to access resources provided by a computing resource service.

In an embodiment, the request further specifies a set of resource names corresponding to particular resources or resource types maintained by computing resource services. These resource names are utilized to scope down policies applicable to a user or role to identify a most restrictive response corresponding to these particular resources or resource types. For example, if a policy specifies that a user is authorized to access all resources provided by a computing resource service, and a resource name is provided in the request corresponding to a particular resource, the policy is scoped down to identify a privilege that indicates that the user is authorized to access the particular resource instead of all resources by the computing resource service. Thus, resource names specified in the request that correspond to resources or resource types provided by the computing resource services serve as parameters to narrowly tailor policies from the policy management service applicable to user requests to access resources provided by a computing resource service provider.

As an illustrative example, a policy corresponding to a user and/or role can specify that the user is authorized to access all resources of a computing resource service, as illustrated below.

```
{
    "Version": "2012-10-17",
    "Statement": [
        {
            "Effect": "Allow",
            "Action": "datastorageservice:*",
            "Resource": "*"
        }
    ]
}
```

In the request to the security token service, the customer can specify a resource name corresponding to a particular resource. This resource name is utilized to scope down the policy such that it is applicable for the particular resource in a restrictive manner. The resource name is provided in an API call, as illustrated below.

rn:crsp:datastorageservice:::user_specific_container_name/*

This causes an authorization service to process the policy and the resource name to create a restrictive policy, as illustrated below.

```
{
    "Version": "2012-10-17",
    "Statement": [
        {
            "Effect": "Allow",
            "Action": "datastorageservice:*",
            "Resource": "rwcrsp:datastorageservice:::user_specific_container_name/*"
        }
    ]
}
```

Thus, by providing a resource name corresponding to a particular resource, an authorization service modifies the privileges set forth in an original policy to narrowly tailor the privileges to apply to the particular resource.

In an embodiment, the security token service determines 504 whether the requestor can be authenticated and, if so, is authorized to have a security token generated based at least in part on the request. The requestor may provide, via the request, credential information usable by the security token service to authenticate the requestor. Further, using this credential information, the security token service identifies one or more policies applicable to the requestor and to the request itself. These one or more policies specify a set of permissions and privileges for the requestor. If the security token service determines that the requestor cannot be authenticated and/or that the requestor is not authorized to have the security token service generate a security token on its behalf, the security token service will deny 506 the request.

In an embodiment, if the requestor is successfully authenticated and is authorized to have the security token service generate a security token on the requestor's behalf, the security token service evaluates the received API calls to identify 508 the policy resource names, as well as any other resource names corresponding to resources and resource types, from the request. Further, in an embodiment, the security token service verifies 510 the provided policy resource names and other resource names to determine whether these policy resource names and other resource names correspond to active policies and resources, respectively. It should be noted that the process 500 can be performed without verifying the provided resource names. In an embodiment, if a policy resource name refers to an expired policy or a policy that does not exist, requests that include this security token are denied, as a missing or expired policy causes the authorization service to determine that requests are to be denied.

In an embodiment, the security token service determines 512 whether the policy resource names provided in the request have been verified successfully. If the security token service determines that one or more policy resource names could not be verified (e.g., the associated policies are unavailable, invalid, etc.), the security token service denies 506 the request from the requestor. In an embodiment, if one or more policy resource names could not be verified, the security token service transmits a notification to the requestor to indicate that one or more policies corresponding to the unverified policy resource names are unavailable for use. This enables the requestor to indicate whether the security token is to be created with the remaining, verified policy resource names. The requestor can also provide substitute policy resource names to replace any unverified policy resource names. This causes the security token service to initiate the process 500 anew.

In an embodiment, if the provided policy resource names have been verified successfully, the security token service uses the information included in the API calls, including the policy resource names and other resource names, to generate 514 a security token that specifies these resource names. The security token specifies a credentials field, which specifies an identifier of the user to whom the security token is provided and/or the role that can be assumed by the user in accessing the computing resource service provider. In an embodiment, the credentials field further includes a set of temporary credentials usable to authenticate the user of the security token. Further, the security token further includes a resource name field, which specifies one or more policy resource names corresponding to scope down policies applicable to the user and/or user role. Further, the resource name field, in an embodiment, specifies a set of resource names corresponding to resources or resources types provided by a computing resource service. Resource names corresponding to particular resources or resource types are used by a policy evaluation engine to scope down any policies obtained based at least in part on the credential information specified in the credential field.

In an embodiment, the security token service provides 516 the security token to fulfill the request. The security token service, in an embodiment, provides the security token to the requestor. This enables the requestor to perform its own authentication process to determine which users are to obtain and utilize the security token to access the resources provided by the computing resource service provider. In an embodiment, the security token service provides the security token to users designated by the requestor in the API calls or specified in the credentials field of the security token. This enables the computing resource service provider to authenticate these users in response to requests from these users to access resources provided by the computing resource service provider.

Figure 6:
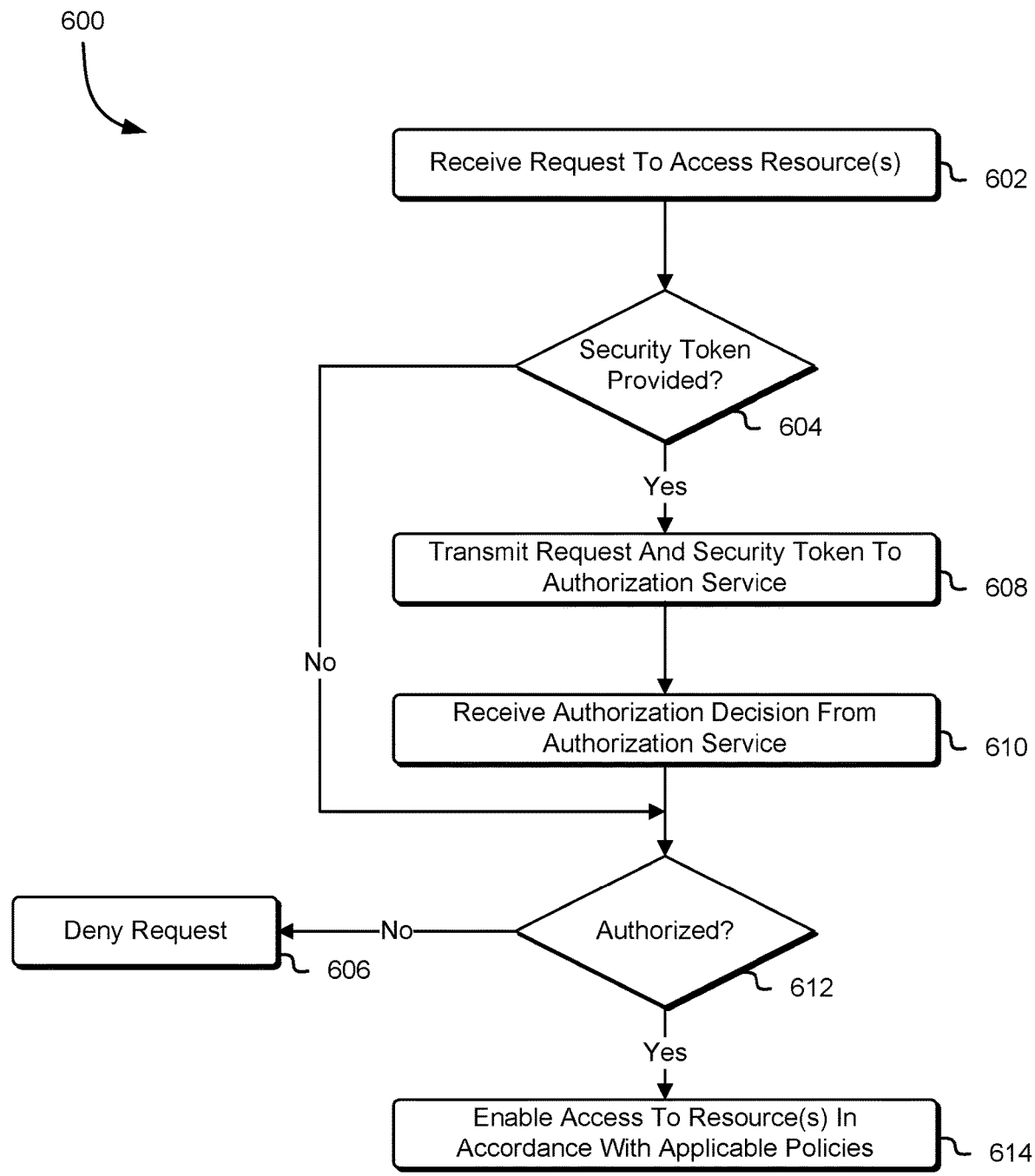
FIG. 6 shows an illustrative example of a process for obtaining an authorization decision regarding a request to access a resource based at least in part on information specified in a security token in accordance with at least one embodiment.

FIG. 6 shows an illustrative example of a process 600 for obtaining an authorization decision regarding a request to access a resource based at least in part on information specified in a security token in accordance with at least one embodiment. The process 600 is performed by any computing resource service provided by a computing resource service provider. The process 600 can also be performed by a computer system or abstraction thereof (such as one or more virtual machines operating via a hypervisor), implemented using hardware and software, and can comprise one or more processors and memory that stores executable instructions whose execution by the one or more processors causes the computer system to cause an authorization service to authenticate a user and generate an authorization decision for a request provided by the user based at least in part on applicable policies.

In an embodiment, a computing resource service receives 602 a request from a user to access one or more resources provided by the computing resource service. The request, in an embodiment, is digitally signed by the user and includes a security token usable to identify a set of privileges applicable to the request and usable to determine whether the request can be fulfilled. As noted above, the security token includes a credential field that specifies an identifier of an access key and the access key itself. This access key is utilized by the user to digitally sign its request to the computing resource service. Thus, the security token is utilized to authenticate the user and the request.

In an embodiment, the computing resource service evaluates the request to determine 604 whether a security token has been provided by the user. If the security token has not been provided, in an embodiment, the computing resource service denies 606 the request, as an identifier usable to locate the access key usable to authenticate the digital signature of the request is not available without the security token. In an embodiment, if the security token has not been provided, the computing resource service determines 612 whether the user is authorized to access the resources specified in its request, as the security token may not be required for all requests to the computing resource service. The computing resource service obtains any policies applicable to the user and/or resources to determine whether the request can be fulfilled. In an embodiment, the computing resource service transmits a request to the authorization service to obtain an authorization decision based on these policies.

If the security token is provided in the request, in an embodiment, the computing resource service transmits 608 the received request and the security token to an authorization service. As noted above, the authorization service obtains, from a policy management service, policies applicable to the user and to the resources that the user seeks access to. These policies may be identified based at least in part on an identifier of the user, as well as other information from the request regarding the resources the user seeks access to. Further, the authorization service obtains policies corresponding to the policy resource names specified in the security token. These additional policies are used to scope down the policies obtained based at least in part on the identifier of the user and of the resources the user seeks access to. The authorization service evaluates all applicable policies to generate an authorization decision that adheres to the principle of the most restrictive response (e.g., most restrictive privileges are used to determine whether the request should be fulfilled).

In an embodiment, the computing resource service receives 610 this authorization decision from the authorization service and uses this authorization decision to determine 612 whether the user is authorized to access the resources in accordance with its request. If the authorization decision indicates that the request should not be fulfilled, the computing resource service denies 606 the user's request, as the user is not authorized to access the resources in accordance with its request. However, if the authorization decision specifies that the request can be fulfilled, the computing resource service enables 614 access to the requested resources in accordance with the applicable set of policies identified by the authorization service. In an embodiment, the authorization decision specifies a policy that encompasses the most restrictive set of privileges identified by the authorization service. The computing resource service utilizes this policy to control access by the user to the requested resources.

Figure 7:
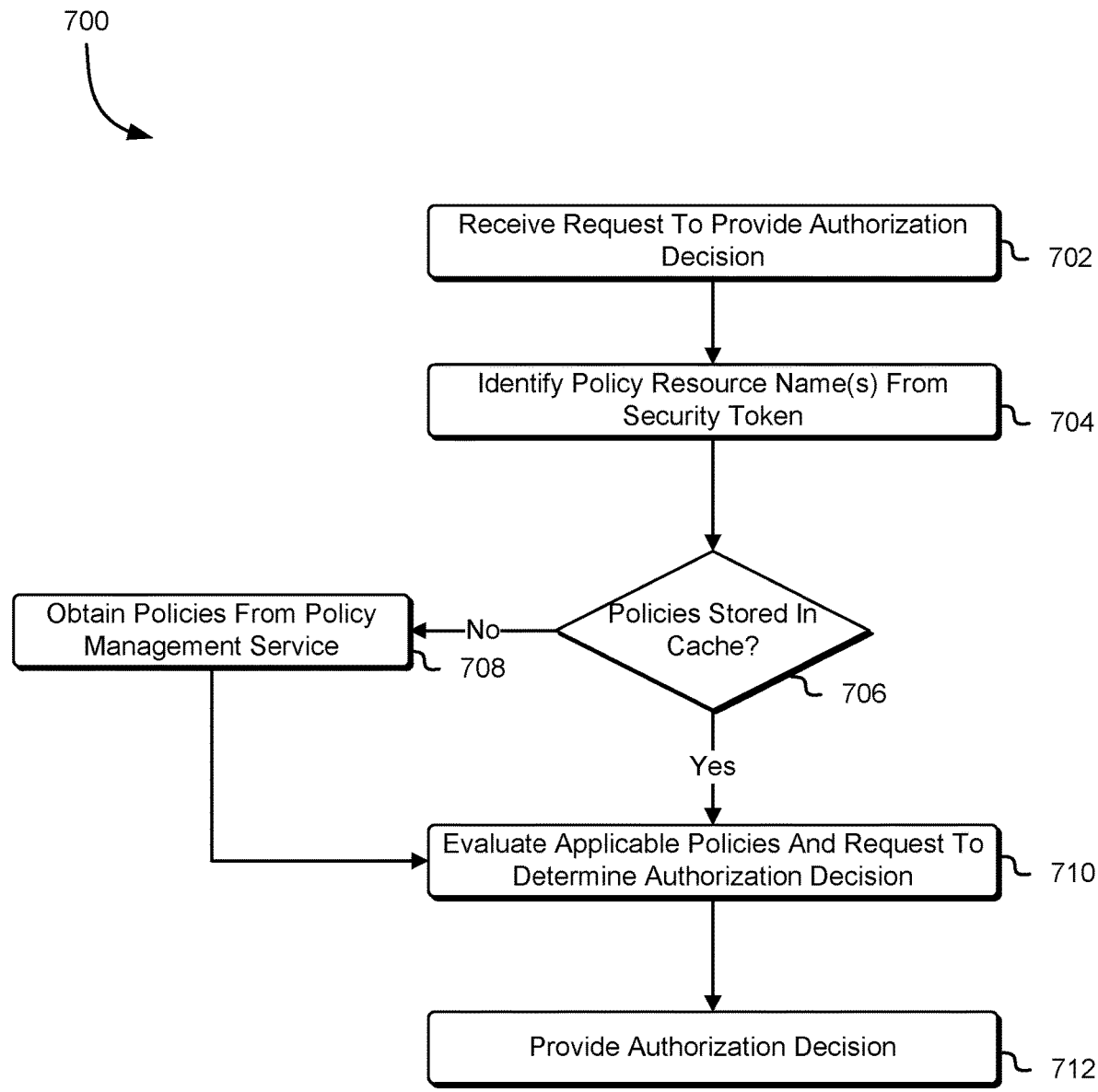
FIG. 7 shows an illustrative example of a process for obtaining and utilizing a set of policies corresponding to policy resource names specified in a security token to generate an authorization decision for a request to access a resource in accordance with at least one embodiment.

FIG. 7 shows an illustrative example of a process 700 for obtaining and utilizing a set of policies corresponding to policy resource names specified in a security token to generate an authorization decision for a request to access a resource in accordance with at least one embodiment. The process 700 is performed by an authorization service or a component of an authorization service, such as a policy evaluation engine described above. The process 700 can also be performed by a computer system or abstraction thereof (such as one or more virtual machines operating via a hypervisor), implemented using hardware and software, and can comprise one or more processors and memory that stores executable instructions whose execution by the one or more processors causes the computer system to perform the operations of an authorization service.

In an embodiment, the authorization service receives 702 a request from a computing resource service to provide an authorization decision for a request obtained by the computing resource service to access resources provided by the computing resource service. The request from the computing resource service includes the original request from a user to access resources provided by the computing resource service. Further, the request from the computing resource service includes a security token provided by the user. As noted above, the security token specifies a set of policy resource names 704 corresponding to a set of scope down policies usable to narrow a set of privileges specified in a set of policies applicable to the user and to the resources to which the user seeks access to. In an embodiment, the security token also specifies a set of resource names corresponding to particular resources and/or resource types. These resource names are usable to narrow the set of privileges specifies in the set of policies applicable to the user and to the resources to which the user seeks access to.

In an embodiment, the authorization service determines 706 whether any policies corresponding to the policy resource names specified in the security token are stored in a cache of the authorization service. The cache may store policies previously evaluated by the authorization service in response to other requests from other computing resource services. In an embodiment, if any of the policies corresponding to the policy resource names specified in the security token are not stored in the cache, the authorization service obtains 708 these policies from a policy management service. The authorization service provides the policy resource names from the security token to the policy management service. The policy management service uses the policy resource names to identify the corresponding policies and provides these policies to the authorization service. Further, the policy management service identifies other policies that are applicable to the request from the user. This can include policies applicable to the user (e.g., user or user role is specified in the policy as being a principal, etc.) or to the resources themselves. These policies are provided in addition to the scope down policies corresponding to the policy resource names provided by the authorization service.

In an embodiment, the authorization service evaluates 710 the applicable policies and the provided request to determine an authorization decision. The authorization service, in an embodiment, identifies, from each applicable policy, the privileges granted or expressly denied to the user. Based at least in part on these privileges, the authorization service determines the most restrictive set of privileges to apply to the request from the user. For example, if a particular privilege specifies that the user is authorized to access a particular resource but another privilege specifies that the user is not authorized to access the particular resource, the authorization service selects the restrictive privilege over the permissive privilege, resulting in a decision to deny authorization to the user to access the particular resource. Using the most restrictive set of privileges, the authorization service generates an authorization decision specifying whether the request from the user should be fulfilled or not. In an embodiment, if the authorization decision specified that the request should be fulfilled, the authorization service provides, in the decision, the set of privileges identified by the authorization service. This enables the computing resource service to enable access to the resources in accordance with these privileges. The authorization service provides 712 the authorization decision to the computing resource service to enable processing of the user's request in accordance with the authorization decision.

Figure 8:
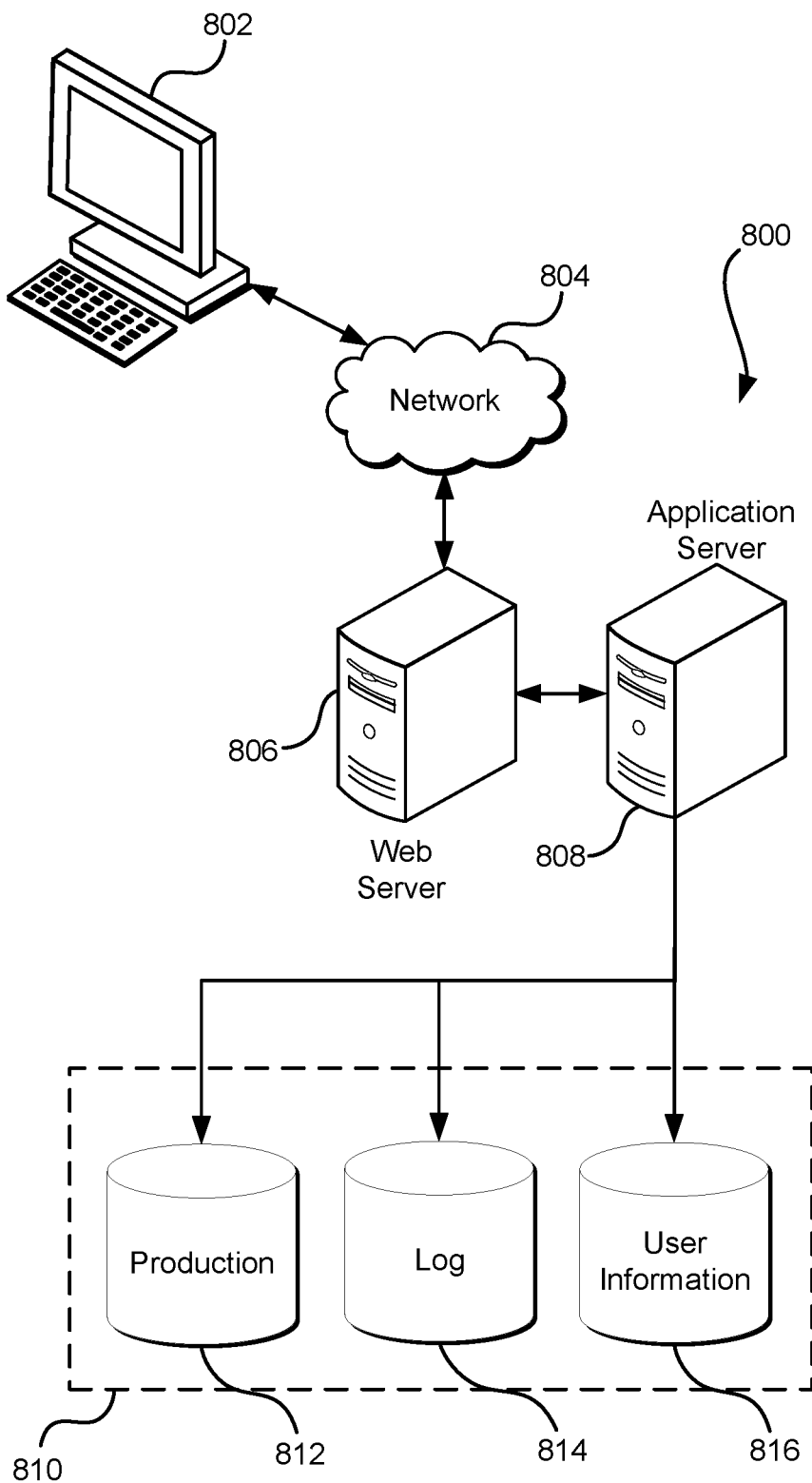
FIG. 8 shows an illustrative example of a system in which various embodiments can be implemented.

FIG. 8 illustrates aspects of an example system 800 for implementing aspects in accordance with an embodiment. As will be appreciated, although a web-based system is used for purposes of explanation, different systems may be used, as appropriate, to implement various embodiments. In an embodiment, the system includes an electronic client device 802, which includes any appropriate device operable to send and/or receive requests, messages, or information over an appropriate network 804 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly-addressable communications network, as the system includes a web server 806 for receiving requests and serving content in response thereto, although for other networks an alternative device serving a similar purpose could be used as would be apparent to one of ordinary skill in the art.

In an embodiment, the illustrative system includes at least one application server 808 and a data store 810 and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually and/or through other senses. The handling of all requests and responses, as well as the delivery of content between the client device 802 and the application server 808, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 810, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 812 and user information 816, which are used to serve content for the production side. The data store also is shown to include a mechanism for storing log data 814, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 810.

The data store 810, in an embodiment, is operable, through logic associated therewith, to receive instructions from the application server 808 and obtain, update or otherwise process data in response thereto and the application server 808 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 802. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 800 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 800, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols and such a system also includes a number of workstations running any of a variety of commercially-available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle °, Microsoft °, Sybase °, and IBM as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a request for a token, wherein the request comprises a set of identifiers of a set of access control policies that define permissions for access to a set of resources;
   generating the token to comprise the set of identifiers of the set of access control policies;
   obtaining a second request to access a resource, the second request including the token;
   retrieving the set of access control policies, the set of access control policies further comprising a scope down policy, the scope down policy restricting access to the resource enumerated in the second request, the access subject to an intersection of the set of access control policies; and
   determining, based on the set of access control policies, whether to grant access to the resource to fulfill the second request.

2. The computer-implemented method of claim 1, wherein the method further comprises:
   determining, based on the set of access control policies, a set of privileges applicable to the second request; and
   granting access to the resource as a result of the set of privileges permitting access to the resource.

3. The computer-implemented method of claim 1, wherein the method further comprises:
   utilizing the permissions for access from the set of access control policies and second permissions from a second set of access control policies corresponding to a requestor that submitted the second request to identify a set of privileges applicable to the second request; and
   granting the access to the resource as a result of the set of privileges permitting access to the resource.

4. The computer-implemented method of claim 1, wherein:
   the request further comprises a second set of identifiers of the set of resources; and
   the method further comprises modifying, using the second set of identifiers of the set of resources, the permissions for access to cause the permissions to be applicable to the set of resources.

5. A system, comprising:
   one or more processors;
   memory that stores computer-executable instructions that, if executed, cause the one or more processors to:
      obtain a request for a token, wherein the request indicates a set of access control policies;
      generate the token to comprise a set of identifiers of the set of access control policies; and
      transmit the token in response to the request, causing the token to be used, in conjunction with an operation against a resource, to cause a set of operations to be performed in association with the resource, the set of operations limited to the resource in accordance with a restrictive intersection of privileges of the set of access control policies.

6. The system of claim 5, wherein the request specifies the set of identifiers of the set of access control policies.

7. The system of claim 5, wherein:
   the request specifies the set of access control policies; and
   the computer-executable instructions further cause the one or more processors to:
      assign the set of identifiers to the set of access control policies; and store the set of access control policies to provide access to the set of access control policies.

8. The system of claim 5, wherein:
the request specifies an identifier of the resource; and
the token further comprises the identifier of the resource, causing the token to be used to modify the set of access control policies to be applicable to the resource.

9. The system of claim 5, wherein the token further specifies an identifier of a user, causing the token to be used to identify a second set of access control policies corresponding to the user usable in conjunction with the set of access control policies to determine whether the set of operations is permitted.

10. The system of claim 5, wherein:
the request specifies an identifier of an authorization resource; and
the token further comprises the identifier of the authorization resource, causing the token to be used to provide the set of access control policies to the authorization resource for determining whether to cause performance of the set of operations.

11. The system of claim 5, wherein the set of identifiers are resource names that identify the set of access control policies.

12. The system of claim 5, wherein transmitting the token causes the set of identifiers to be used to obtain the set of access control policies usable to cause the set of operations to be performed.

13. A non-transitory computer-readable storage medium comprising executable instructions that, as a result of execution by one or more processors of a computer system, cause the computer system to at least:
obtain a request to access a resource, wherein the request comprises a token that indicates an intersection of a set of identifiers to a set of access control policies, the set of identifiers restricting privileges associated with the set of access control policies;
use the set of identifiers to obtain the set of access control policies; and
process the request according to the set of access control policies, application of the set of access control policies further restricted to the resource.

14. The non-transitory computer-readable storage medium of claim 13, wherein:
at least one of the set of access control policies specifies a second set of identifiers of a second set of access control policies; and
the executable instructions further cause the computer system to:
use the second set of identifiers to obtain the second set of access control policies; and
process the request according to the second set of access control policies.

15. The non-transitory computer-readable storage medium of claim 13, wherein:
the token indicates an identifier of the resource; and
the executable instructions further cause the computer system to modify, using the identifier of the resource, the set of access control policies to cause the set of access control policies to be applicable to the resource.

16. The non-transitory computer-readable storage medium of claim 13, wherein the executable instructions further cause the computer system to:
utilize the set of access control policies and a second set of access control policies corresponding to a requestor that submitted the request to identify a set of privileges applicable to the request; and
process the request according to the set of privileges.

17. The non-transitory computer-readable storage medium of claim 13, wherein:
the token indicates an identifier of an authorization resource; and
the executable instructions that cause the computer system to process the request according to the set of access control policies further cause the computer system to:
provide the set of access control policies to the authorization resource; and
obtain an authorization response from the authorization resource indicating whether the request is to be fulfilled.

18. The non-transitory computer-readable storage medium of claim 13, wherein the executable instructions that cause the computer system to use the set of identifiers to obtain the set of access control policies further cause the computer system to:
transmit the set of identifiers to a second computer system of a policy management service to cause the second computer system to identify, based on the set of identifiers, the set of access control policies; and
obtain, from the second computer system, the set of access control policies.

19. The non-transitory computer-readable storage medium of claim 13, wherein the executable instructions further cause the computer system to:
use the set of access control policies to identify a set of privileges applicable to the request; and
determine whether to fulfill the request based on the set of privileges.

20. The non-transitory computer-readable storage medium of claim 13, wherein the executable instructions further cause the computer system to deny the request as a result of the set of access control policies, corresponding to the set of identifiers, specifying at least one privilege indicating that the request is to be denied.

* * * * *